2,940,999
ALKYLDIHALOBORINES

David R. Stern, Fullerton, and Lahmer Lynds, North Hollywood, Calif., assignors to American Potash & Chemical Corporation, a corporation of Delaware No Drawing. Filed June 30, 1958, Ser. No. 745,248

21 Claims. (Cl. 260—543)

This invention relates to the preparation of alkyldihaloborines, $RBX_2$, where R represents any alkyl group, other than methyl, or saturated alicyclic radical and represents a halogen, e.g., chlorine or bromine.

Cycloalkyldihaloborines and acyclic alkyldihaloborines are important intermediates in the formation of substituted borazoles, boronic acids and their esters and anhydrides (boroxines). The conversion of a typical alkyldihaloborine into a substituted borazole is shown in the last example forming a portion of the specification; the same process may be used to convert other dihaloborines, including the alkyldibromoborines. The substituted borazoles, as described in the Scott et al. Patent, 2,821,463, may be used as dielectrics and gasoline additives. Alkylboronic acids may be prepared from the alkyldihaloborines by a well known hydrolytic process (see E. G. Rochow et al., The Chemistry of Organometallic Compounds, 1957) and the resulting alkylboronic acids have utility in polymers as described in Patents 2,517,944 and 2,517,945 to Upson. Also, the alkylboronic acids may be used as gasoline additives as described in Darling Patents Nos. 2,710,250 and 2,710,251.

To acyclic alkyldihaloborines and cycloalkyldihaloborines, including both the dichloroborines and the dibromoborines, may be used directly, however, as igniters for liquid propellants. In addition, they find utility as igniters in the event of jet flameouts. The alkyldichloroborines are pyrophoric and must be handled only in the presence of a non-oxidizing, inert and dry atmosphere while the alkyldibromoborines are somewhat more stable and hence more easily handled—they are not pyrophoric at room temperature but are so at temperatures whereat they would find utility as jet reigniters, etc.

The use of these compounds has been severely limited because of uneconomical and complicated methods of synthesis which, in many instances, gave mixtures that could not be separated into pure components.

Several methods of preparing alkyldihaloborines have appeared in the literature. Wiberg (E. Wiberg, et al.), FIAT Rev. German Sci. 1939–56, Inorg. Chem. Pt. I, 23, 226–39 (1948); E. Wiberg and W. Ruschmann, Ber. 70, 1583–91 (1937) reacted boron trichloride and dimethyl zinc to prepare trimethyl borine. These workers found that methyldichloroborine and dimethylchloroborine were also produced in the reaction as by-products and that their separation by distillation from the resulting mixture was inherently difficult. Several investigators (R. B. Booth and C. A. Kraus, J. M. Chem. Soc., 74, 1415 (1952); E. Frankland, J. Am. Chem. So., 3378–83 (1953)) discovered that dialkylchloroborines could be prepared by the reaction of a trialkyl borine with a hydrogen halide. Further oxidation at elevated temperatures resulted in the formation of alkyldihaloborines. Various investigators (A. B. Burg, J. Am. Chem. Soc., 62, 2228–34 (1940); P. A. McCusker, E. C. Ashby, H. S. Makowski, J. Am. Chem. Soc., 79, 5179–96 (1957)) prepared alkyldihaloborines by the reaction between alkylboronic acid anhydrides (trialkylboroxines) and boron halides. However, preparation of trialkylboroxines necessitated a tedious dehydration of the respective alkylboronic acids which were synthesized from alkylborates and alkyl Grignard reagents. These aforementioned processes depend upon the use of active organo-metallic compounds which are mechanically and chemically involved. Other inherent disadvantages to these processes are the high cost of reactants and low yield of products.

It is therefore an object of this invention to provide an economical and straight-forward method for the production of certain alkyldichloroborines and alkyldibromoborines.

It is a further object of this invention to provide a gas phase reaction which may be carried out continuously and substantially in the absence of objectionable side reactions.

Ancillary objects and advantages of this invention, if not specifically set forth, will become apparent in the course of the disclosure which follows:

Generally, it has been found that alkyldihaloborines may be prepared by a reaction carried on in the presence of an asbestos catalyst at between about 300° C. and 500° C. between hydrogen, a boron trihalide and a hydrocarbon having at least a single center of olefinic unsaturation.

More particularly, it has been found that alkyldihaloborines and cycloalkyldihaloborines can be manufactured by a simple gas phase reaction between hydrogen, a boron trihalide and an acyclic alkene, or an alicyclic hydrocarbon having at least a single center of olefinic unsaturation. The process is also applicable to a certain limited number of substituted alkenes. Specifically, substitutions on carbon atoms at least one removed from the double bond will not affect the addition reaction. Preferred substituted alkenes are those having a halogen corresponding to the halogen of the boron trihalide with which the alkene is reacted. To practice the process, one need only pass a mixture of hydrogen, the boron halide, i.e., boron trichloride or boron tribromide, and the organic material over an asbestos catalyst maintained at at least about 300° C. Optimum yields are obtained at temperatures between 400° and 500° C. Residence times of 0.50 to 0.95 minute and preferably between about 0.61 and 0.86 minute are recommended at the optimum temperatures. Temperatures as high as 600° C. can be employed if the gas flow rate is sufficiently high to avoid product degradation. Preferred molar ratios are between 1 and 8 parts hydrogen to 1 part of the boron trihalide and 1 part of the organic material, though the reaction appears to proceed in the desired manner irrespective of the reactant ratios.

The most convenient method of operation is simply to pack a tube with the asbestos catalyst, apply sufficient heat externally to raise the internal temperature to within the 300–600° C. range, and run the hydrogen, boron trihalide and unsaturated olefinic material in one end thereof. The hydrohalogen gas and alkyldihaloborine products are secured in admixture with a boron trihalide and any of the other reactants which may have been present in excess. The boron trihalide may be separated from the dihaloborine by simple fractional distillation. Where boron trichloride is used as the boron trihalide reactant, the dihaloborine will be obtained as the condensate and the boron trichloride contaminant, having a boiling point of about 13° C. at 764 mm. Hg will be recovered in the gas phase, the condenser being maintained at slightly above 13° C. Where boron tribromide is used as the boron trihalide, the desired product also will be found to have a boiling point greater than that of the boron tribromide, about 91° C. at 760 mm. Hg, and hence the product will be condensed at a temperature slightly above this and the boron tribromide will be recovered as a gas. It is seen, therefore, that the separation of the boron tribromide or boron trichloride (as well as any additional reactants which may be present) is an elementary problem of distillation. Yields in excess of 90 percent, based on the boron halides, may easily be realized depending on the efficiency of the recovery system.

As stated above, the catalyst used is asbestos. Most conveniently, it is simply packed in a tube through which the reactants are passed. A preferred form of the asbestos is chrysotile, which, according to the Canadian Mining and Metallurgical Bulletin of April 1951, has the theoretical formula $3MgO.2SiO_2.2H_2O$. Its crystalline structure is fibrous and asbestiform, and its crystal system is monoclinic. Other forms of asbestos which may be used are: crocidolite, $NaF_2(SiO_3)_2.FeSiO_3xH_2O$; amosite, $$(Fe.Mg)SiO_3—1–5\%H_2O$$

anthophyllite, $(Mg.Fe)_7Si_8O_{22}(OH)_2$; tremolite, $$Ca_2Mg_5Si_8O_{22}(OH)_2$$

and actinolite, $Ca(Mg.Fe)_3(SiO_3)_4xH_2O$.

Generally, the unsaturated hydrocarbon reactants are introduced in a stoichiometric excess to insure maximum utilization of the boron halides. As aforestated, the entire group of compounds containing boron-carbon bonding is highly susceptible to oxidation and, in some cases (the dichloroborines) the products are spontaneously inflammable in air. All must be handled under dry atmospheres.

The acyclic alkenes which may be used have between 2 and 9 carbon atoms and may have more than a single center of unsaturation. Any of the cycloalkenes having 3 to 9 carbon atoms may be used and the cycloalkenes preferred (because of their availability) are cyclopentene and cyclohexene.

The practice of the process will become further apparent from the consideration of the following examples which are set forth by way of illustration.

*Example I—Ethyldichloroborine*, $CH_3CH_2BCl_2$

Hydrogen, boron trichloride and ethylene were passed through a tube of one inch diameter and 24 inch length (volume 309 cm.³) packed with platinized chrysotile asbestos maintained at 440° C. A 47 percent conversion (based on ethylene per pass) was realized with flow rates of 375, 48 and 85 cm.³/min. under STP, hydrogen, boron trichloride and ethylene, respectively. In further runs mole ratios in the region of 1 to 8 hydrogen to boron trichloride (at constant ethylene flow) and temperatures between 440° and 480° C. gave the highest yields. However, the reaction produced ethyldichloroborine with no side reactions and appeared to be independent of the molar ratios and flow rates of the reacting species. The product and excess boron trichloride were condensed at −78° C., collected in a boiler and separated by fractional distillation under argon. Ethyldichloroborine was removed at 50.5° C./759 mm. Hg. An over-all yield in excess of 90 percent was obtained, based on boron trichloride. The molecular weight was calculated at 110.4 (theoretical 110.7) from vapor density measurements. Analyis of the product:

| Component | Weight percent | |
|---|---|---|
| | Chemical Analyses | Theoretical |
| B | 9.39 | 9.75 |
| Cl | 67.50 | 64.00 |

As stated, various other runs were made and optimum flow rates were determined to be 360 to 508 cm.³ per minute under standard conditions.

*Example II—n-Propyldichloroborine*, $C_3H_7BCl_2$

Propyldichloroborine was prepared from propylene under the same conditions and using the same catalyst as described in Example I. The product and excess boron trichloride were separated by fractional distillation under argon. n-Propyldichloroborine was removed at 81.0° C./765 mm. Hg. Analysis of the product:

| Component | Weight percent | |
|---|---|---|
| | Chemical Analyses | Theoretical |
| B | 8.88 | 8.68 |
| Cl | 54.7 | 56.8 |

*Example III—Ethyldibromoborine*, 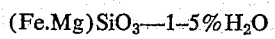 $C_2H_5BBr_2$

Hydrogen, ethylene and boron tribromide were passed through a tube packed with chrysotile asbestos maintained at 430° C. A conversion per pass of 25 percent, based on boron tribromide, was realized with flow rates of 300, 52 and 27 cm.³ per minute for the respective gases. The product and excess boron tribromide were separated by fractional distillation under argon. Ethyldibromoborine has a boiling point of 95.0° C./758 mm. Hg. Analysis of the product:

| Component | Weight percent | |
|---|---|---|
| | Chemical Analyses | Theoretical |
| B | 5.74 | 5.42 |
| Br | 79.2 | 80.0 |

*Example IV—Cyclohexyldichloroborine*, $C_6H_{11}BCl_2$

Hydrogen, boron trichloride and cyclohexene were passed through a tube packed with chrysotile asbestos and maintained at 440° C. The product, excess cyclohexene and boron trichloride were separated by fractional distillation under argon. Cyclohexyldichloroborine was removed at atmospheric pressure 165.5° C./765 mm. Hg. Analysis of the product:

| Component | Weight percent | |
|---|---|---|
| | Chemical Analyses | Theoretical |
| B | 6.39 | 6.56 |
| Cl | 42.91 | 43.0 |

A table is set forth below showing the reaction between various of the boron trihalides and acyclic alkenes or cycloalkenes. In each case, one mole of hydrogen reacts with the other two reactants listed and one mole of the appropriate hydrohalogen acid is secured as a reaction product. Each of the unsaturated materials listed below is commercially available. Hence the table sets forth preferred reactants only.

| Example | Hydrocarbon | Trihalide | Product | Wt. Percent B | Wt. Percent Halogen |
|---|---|---|---|---|---|
| V | isobutylene | $BCl_3$ | $C_4H_9BCl_2$ | 7.80 | 51.20 |
| VI | n-amylene | $BCl_3$ | $C_5H_{11}BCl_2$ | 7.08 | 46.37 |
| VII | hexene-1 | $BCl_3$ | $C_6H_{13}BCl_2$ | 6.48 | 42.49 |
| VIII | heptene-1 | $BCl_3$ | $C_7H_{15}BCl_2$ | 5.98 | 39.25 |
| IX | octene-1 | $BCl_3$ | $C_8H_{17}BCl_2$ | 5.55 | 36.35 |
| X | nonene-2 | $BCl_3$ | $C_9H_{19}BCl_2$ | 5.18 | 33.93 |
| XI | propylene | $BBr_3$ | $C_3H_7BBr_2$ | 5.06 | 74.78 |
| XII | isobutylene | $BBr_3$ | $C_4H_9BBr_2$ | 4.75 | 70.17 |
| XIII | n-amylene | $BBr_3$ | $C_5H_{11}BBr_2$ | 4.47 | 66.10 |
| XIV | hexene-1 | $BBr_3$ | $C_6H_{13}BBr_2$ | 4.23 | 62.47 |
| XV | heptene-1 | $BBr_3$ | $C_7H_{15}BBr_2$ | 4.01 | 59.23 |
| XVI | octene-1 | $BBr_3$ | $C_8H_{17}BBr_2$ | 3.81 | 56.28 |
| XVII | nonene-2 | $BBr_3$ | $C_9H_{19}BBr_2$ | 3.63 | 53.65 |
| XVIII | cyclopentene | $BCl_3$ | $C_5H_9BCl_2$ | 7.18 | 47.04 |
| XIX | do | $BBr_3$ | $C_5H_9BBr_2$ | 4.51 | 66.69 |
| XX | cyclohexene | $BBr_3$ | $C_6H_{11}BBr_2$ | 4.30 | 63.50 |
| XXI | allyl chloride | $BCl_3$ | $ClC_3H_6BCl_2$ | 6.75 | 66.37 |
| XXII | 4-chlorobutene-1 | $BCl_3$ | $ClC_4H_8BCl_2$ | 6.56 | 61.03 |
| XXIII | 5-chloropentene-1 | $BCl_3$ | $ClC_5H_{10}BCl_2$ | 5.75 | 56.48 |
| XXIV | allyl bromide | $BBr_3$ | $BrC_3H_6BBr_2$ | 3.80 | 83.74 |

The reaction mechanism is not fully understood. However, it has been ascertained that the asbestos acts catalytically and the results obtained are not due solely to surface phenomena associated with an extended asbestos reaction surface. A variety of materials such as glass beads, carbon rings, platinized alundum and Vermiculite have been tried in place of asbestos and have proven ineffective. Also, platinum, well known as a hydrogenation catalyst, was tried alone without success. It is possible that $HBX_2$ exists in situ in a transitory state, but it has not been possible to identify either $HBCl_2$ or $HBBr_2$. However, since no active metal is present to form the metal chloride, (e.g., $AlCl_3$ or $MgCl_2$), it is apparent that the asbestos acts as a genuine catalyst and not in the manner of the metals present in the reaction vessel in the process described in our co-pending application, Serial No. 707,124 filed January 6, 1958 for Organoboron Compounds.

As stated at the outset, one of the several uses for an alkyldihaloborine is as an intermediate in the preparation of borazoles, several uses for which are known. In the example below, the conversion of ethyldichloroborine to a borazole by reaction with aniline is set out. Any of the alkyldihaloborines set out above may be reacted in the same manner to produce the corresponding borazole.

*Preparation of —B,B',B"-triethyl-N,N',N"-triphenylborazole.*—Approximately 50 grams (0.45 mole) of catalytically prepared ethyldichloroborine were reacted with 42 grams (0.45 mole) of aniline in 200 ml. of toluene. The mixture was maintained at 0° C. during the addition and was then refluxed at 110° C. for 12 hours. Upon recrystallization, 5.4 grams of product were obtained. This crystalline solid melted sharply at 159° C. Analysis of the product:

| Component | Weight Percent | |
|---|---|---|
| | Found | Calculated |
| B | 8.04 | 8.26 |
| C | 73.28 | 73.35 |
| H | 7.92 | 7.70 |
| N | 10.3 | 10.69 |

Various alkyldichloroborines are known but the bromo analogs are new compositions of matter. Their properties differ substantially from those of the chloro materials. Specifically, while the alkyldihaloborines are all relatively easily oxidized (and thus all find utility as igniters for liquid propellants), the bromo analogs exhibit considerably more thermal stability than the alkyldichloroborines. The alkyldibromoborines are not pyrophoric at ambient temperatures and are thus far more easily handled than the alkyldichloroborines. However, the former still find utility as reigniters in the event of jet flameouts for the temperatures at which they are used in such applications are sufficiently high to cause ignition readily. The alkyldibromoborines are also considerably easier to reduce with hydrides and borohydrides than are the chloro analogs and they have considerably higher boiling points, an important factor in many reactions.

The terms "alkyl" and "alkene," as used in the claims, are intended to include both acyclic and alicyclic hydrocarbons and radicals.

Obviously, many modifications and variations of this invention as heretofore set forth may be made without departing from the spirit and scope thereof, and therefore only such limitations should be imposed as are indicated in the appended claims.

We claim:

1. A process for the preparation of an alkyldihaloborine comprising: passing a mixture of hydrogen, a boron trihalide selected from the group consisting of boron tribromide and boron trichloride and a compound selected from the group consisting of alkenes and alkenes having a halogen substituted on a carbon atom thereof removed at least one from the double bond, said alkenes having between 2 and 9 carbon atoms, over asbestos at a temperature of between about 300° C. and about 600° C. to form said alkyldihaloborine.

2. A process for the preparation of an alkyldihaloborine comprising: passing a mixture of hydrogen, a boron trihalide selected from the group consisting of boron tribromide and boron trichloride and a compound selected from the group consisting of alkenes and alkenes having a halogen substituted on a carbon atom thereof removed at least one from the double bond, said alkenes having between 2 and 9 carbon atoms, over asbestos at a temperature of between about 300° C. and about 600° C. to form said dihaloborine; between about 1 and 8 moles of hydrogen being provided for each single mole of boron trihalide and each single mole of said alkene material; and recovering said alkyldihaloborine from the reaction mixture so formed.

3. The process of claim 2 wherein the boron trihalide is boron trichloride and the alkene is ethylene.

4. The process of claim 2 wherein the boron trihalide is boron trichloride and wherein the alkene is propylene.

5. The process of claim 2 wherein the boron trihalide is boron tribromide and the alkene is ethylene.

6. The process of claim 2 wherein the boron trihalide is boron trichloride and wherein the alkene is cyclohexene.

7. The process of claim 2 wherein the boron trihalide is boron trichloride and the alkene is butylene.

8. The process of claim 2 wherein the boron trihalide is boron trichloride and wherein the alkene is amylene.

9. The process of claim 2 wherein the boron trihalide is boron tribromide and the alkene is propylene.

10. The process of claim 2 wherein the boron trihalide is boron tribromide and the alkene is cyclohexene.

11. The process for the preparation of an alkyldihaloborine comprising: passing a gaseous mixture of hydrogen, a boron trihalide selected from the group consisting of boron tribromide and boron trichloride and a compound selected from the group consisting of alkenes and alkenes having a halogen substituted on a carbon atom thereof removed at least one from the double bond, said alkenes having between 2 and 9 carbon atoms, over asbestos at a temperature of between about 400° C. and 500° C., the residence time of said gaseous mixture being between about 0.61 and 0.86 minute, to form a mixture of gaseous products containing an alkyldihaloborine, the ratio of reactants in the gas mixture being adjusted to between about 1 and 8 moles hydrogen for each mole of said alkene material; and separating the alkyldihaloborine so formed from said mixture by fractional distillation.

12. The process for the preparation of an alkyldihaloborine comprising: passing a gaseous mixture of hydrogen, a boron trihalide selected from the group consisting of boron tribromide and boron trichloride and a compound selected from the group consisting of alkenes and alkenes having a halogen substituted on a carbon atom thereof removed at least one from the double bond, said alkenes having between 2 and 9 carbon atoms, over asbestos at a temperature of between about 300° C. and about 600° C., the residence time of said gaseous mixture being between about 0.50 and about 0.95 minute, to form a mixture of gaseous products containing an alkyldihaloborine, the ratio of reactants in the gas mixture being adjusted to between about 1 and 8 moles hydrogen for each mole of said alkene material; and separating the alkyldihaloborine so formed from said mixture by fractional distillation.

13. A process for the preparation of an alkyldihaloborine comprising: passing a mixture of hydrogen, a boron trihalide selected from the group consisting of boron tribromide and boron trichloride and a compound selected from the group consisting of alkenes and alkenes having a halogen substituted on the carbon atom thereof removed at least one from the double bond, said alkenes having between 2 and 9 carbon atoms, over chrysotile at a temperature of between about 400° C. and about 500° C. to form said alkyldihaloborine.

14. The process of claim 13 wherein the boron trihalide is boron tribromide.

15. The process of claim 13 wherein the boron trihalide is boron trichloride and wherein the alkene is cyclohexene.

16. The process of claim 13 wherein the boron trihalide is boron trichloride and the alkene is butylene.

17. The process of claim 13 wherein the boron trihalide is boron trichloride and wherein the alkene is amylene.

18. The process of claim 13 wherein the boron trihalide is boron tribromide and the alkene is propylene.

19. The process of claim 13 wherein the boron trihalide is boron tribromide and the alkene is cyclohexene.

20. The process of claim 13 wherein the residence time of said gaseous mixture over said chrysotile is between about 0.61 and 0.81 minute.

21. The process of claim 13 wherein the ratio of reactants in the gas mixture is adjusted to between about 1 and 8 moles hydrogen for each mole of said alkene material.

References Cited in the file of this patent

UNITED STATES PATENTS 2,820,830    McCusker    Jan. 21, 1958

OTHER REFERENCES

Johnson: J.A.C.S., vol. 60, pp. 115–21 (1938).
McCusker et al.: J.A.C.S., vol. 70, pp. 5182–94 (1957).